US005539483A

United States Patent [19]

Nalwa

[11] Patent Number: 5,539,483
[45] Date of Patent: Jul. 23, 1996

[54] PANORAMIC PROJECTION APPARATUS

[75] Inventor: Vishvjit S. Nalwa, Middletown, N.J.

[73] Assignee: AT&T Corp., Murray Hill, N.J.

[21] Appl. No.: 497,341

[22] Filed: Jun. 30, 1995

[51] Int. Cl.⁶ .................................................. G03B 37/04
[52] U.S. Cl. .................. 353/94; 353/30; 353/99; 352/69
[58] Field of Search .......................... 353/30, 37, 94, 353/99, 98; 352/69–71; 348/36

[56] References Cited

U.S. PATENT DOCUMENTS

| 4,890,314 | 12/1989 | Judd et al. | 379/53 |
| 5,016,109 | 5/1991 | Gaylord | 358/225 |
| 5,030,823 | 7/1991 | Obdeijn | 250/223 |
| 5,153,621 | 10/1992 | Vogeley | 353/30 |
| 5,194,959 | 3/1993 | Kaneko et al. | 358/225 |
| 5,264,881 | 11/1993 | Brooke | 353/94 |
| 5,300,966 | 4/1994 | Uehira et al. | 353/30 |

FOREIGN PATENT DOCUMENTS

| 3930774 | 4/1991 | Germany | 353/31 |

*Primary Examiner*—William C. Dowling
*Attorney, Agent, or Firm*—Christopher N. Malvone

[57] ABSTRACT

An omnidirectional or panoramic projector comprise several image producing devices with a common virtual optical center. The images produced by devices such as LCD or film are arranged to form a composite or panoramic image such as a continuous 360 degree image when taken as a whole. The user can view the 360 degree image with little or no distortion at the boundaries of the image segments forming the composite image since the image producing devices have the same or nearly the same virtual optical center.

10 Claims, 6 Drawing Sheets

PANORAMIC PROJECTION APPARATUS

CROSS REFERENCE TO RELATED INVENTION

This application is related to commonly assigned U.S. Patent Application entitled "Panoramic Viewing Apparatus", Ser. No. 08/431,356 still pending.

BACKGROUND OF THE INVENTION

1. Field of the invention

The present invention relates to a projection system; more particularly, a panoramic projection system.

2. Description of the Related Art

In an effort to operate more efficiently, it is desirable to perform some tasks using telepresence. For example, many businesses now hold meetings using telepresence. Telepresence is also useful for distance learning and remote viewing of events such as concerts and sporting events. A more realistic telepresence is provided to a user by providing the user with the capability to switch between views, and thereby mimic, for example, looking around a meeting room.

In the past, when several views were made available to a user, several cameras with different optical centers were used. Such a situation is illustrated in FIG. 1. FIG. 1 illustrates cameras 2, 4, 6 and 8 with optical centers 10, 12, 14, and 16, respectively. When the user decided to change views, he or she simply switched between cameras. In more sophisticated systems, when a user decided to change views, he or she was able to obtain a view from optical centers 10, 12, 14, or 16 as well as from additional optical centers 18, 20, 22, 24 or 26. Views associated with optical centers such as 18, 20, 22, 24, and 26 were obtained by using views from the two cameras nearest to the selected optical center. For example, a view from optical center 18 was obtained by using the views from cameras 2 and 4 and interpolating between the two views so as to simulate a view from optical center 18. Such procedure,,; introduced irregularities into views. In addition, forming these interpolated views required a large amount of computational power and time, and thereby made this technique expensive and slow to respond to a user's commands. This computational overhead also limited the number of users that can simultaneously use the system.

A similar problem exists in 360 degree theaters where image producing devices with different optical centers are used to produce the composite or 360 degree image. Since the image producing devices have different optical centers, there are distortions in the composite image at boundaries between the image segments composing the overall image.

SUMMARY OF THE INVENTION

One embodiment of the present invention provides an omnidirectional or panoramic viewer where several cameras have a common optical center. The field of view of each of the cameras is arranged to form a continuous 360 degree view of an area when taken as a whole. The user can sweep through 360 degrees of viewing, where each view has the same or nearly the same optical center, by simply using the output of one camera or the combination of two cameras without requiring the computational overhead of interpolation used in the prior art. Such an arrangement may be used to enhance use of virtual meeting rooms by allowing a viewer to see the meeting room in a more natural format. This format corresponds closely to a person sitting in the actual meeting who simply turns his or her head to change the view at a particular time.

In another embodiment of the present invention, several users may use the viewing system simultaneously. The data from several cameras is used to provide a continuous 360 degree view of an area and that data is made available to each user. Each user simply selects the data associated with the portion of the view in which he or she is interested.

In yet another embodiment, the present invention provides a panoramic or omnidirectional viewing system that can be used to provide a selectable view to users via a communications network such as a telephone or cable TV network. The information associated with the views produced by this embodiment of the invention may be transmitted over a communications network so that each user can select the portion of data desired for a particular view.

Another embodiment of the present invention provides an omnidirectional or panoramic projector where several image producing devices have a common virtual optical center. The images produced by devices such as LCD (liquid crystal displays) or film are arranged to form a composite or panoramic image such as a continuous 360 degree image when taken as a whole. The user can view the 360 degree image with little or no distortion at the boundaries of the image segments forming the composite image since the image producing devices have the same or nearly the same virtual optical center.

DESCRIPTION OF THE PREFERRED EMBODIMENT

Figure 1:
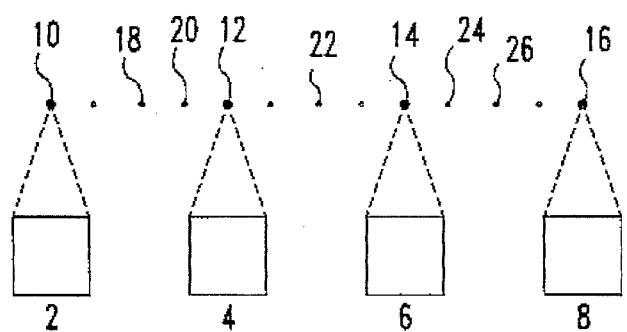
FIG. 1 illustrates a prior art multiple camera viewing system.
Figure 2:
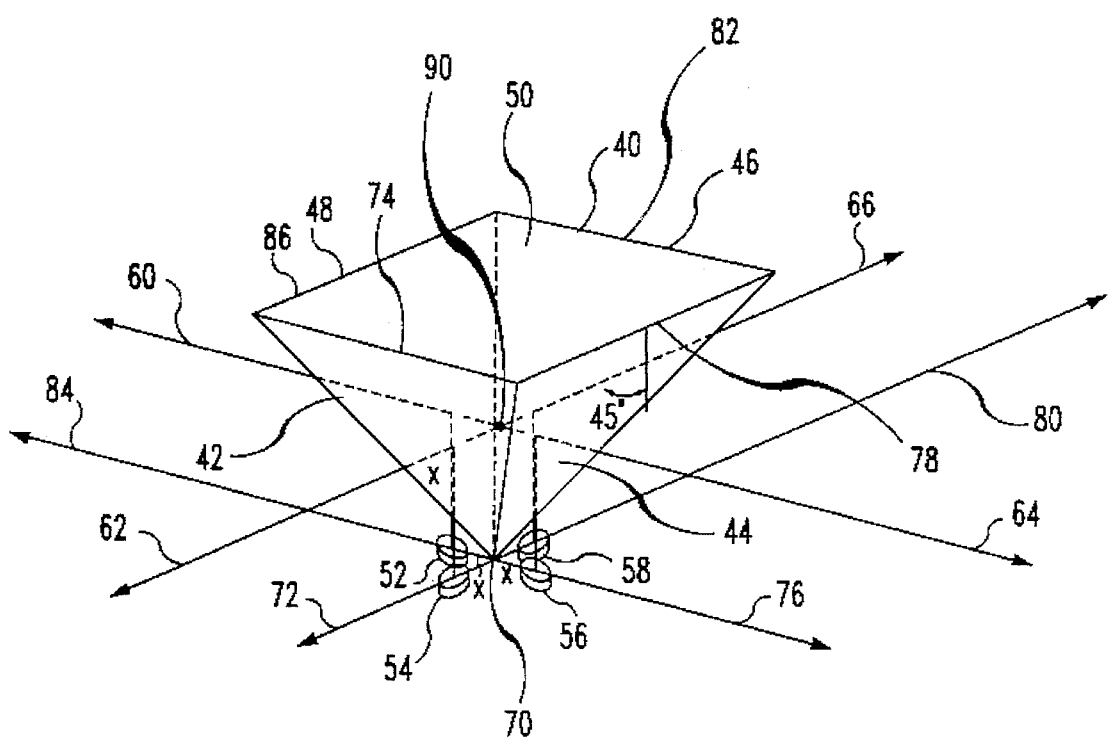
FIG. 2 illustrates a four camera omnidirectional or panoramic viewing system using a four-sided pyramid with reflective surfaces.

FIG. 2 illustrates a four camera system for providing a 360 degree view to a user, where the cameras each have a common virtual optical center within the pyramid. The following discussion will be in terms of capturing an image but it also applies to producing an image with display devices at camera positions 52, 54, 56 and 58 to form a composite or panoramic image. The display devices may be film, LCD panels or electronic display panels such as LED (light emitting diode) panels. Pyramid 40 has reflective sides 42, 44, 46 and 48. In a preferred embodiment, the reflective sides form a 45 degree angle with a plane parallel to base 50 and passing through the vertex of pyramid 40. Cameras 52, 54, 56 and 58 are associated with pyramid reflective surfaces 48, 42, 44, and 46, respectively. The cameras may be image gathering devices such as an optical scanner. As a result, camera 52 views a reflection from surface 48 to enable it to view objects in the direction of arrow 60. Camera 54 views a reflection from surface 42 to view objects in the direction of arrow 62. Camera 56 views a reflection from surface 44 to view objects in the direction of arrow 64, and camera 58 views a reflection from surface 46 to view objects in the direction of arrow 66. Each camera has a 90 degree field of view. The combination of the four cameras viewing reflections from their associated reflective surfaces on pyramid 40, produce a 360 degree view of the area surrounding pyramid 40. It is desirable to locate the optical center of each camera on a plane that is parallel to base 50 and intersects vertex 70 of pyramid 40. Each camera's optical center should also be located on a line that passes through vertex 70 and is perpendicular to the base line of the camera's associated reflective surface. In other words, the camera's optical axis should be perpendicular to base 50. For example, the optical center of camera 54 is located on line 72. Line 72 is perpendicular to base line 74 of reflective surface 42. Line 72 is in a plane that passes through vertex 70 and is parallel to base 50. Likewise, the optical center of camera 56 is positioned on line 76 which is perpendicular to baseline 78, the optical center of camera 58 is positioned on line 80 which is perpendicular to base line 82, and the optical center of camera 52 is positioned on base line 84 which is perpendicular to base line 86.

Each camera optical center is positioned on one of the above described lines at a distance X from vertex 70 and each camera has its optical axes or direction of view pointing perpendicular to base 50. (The distance X should be such that the reflective surface reflects as much of the camera's field of view as desired; however, the defects in the reflective surface become more visible when the camera is moved closer to the reflective surface.) This positioning of optical centers results in the cameras sharing a virtual optical center located at position 90. Virtual optical center 90 is located a distance X from the vertex 70 on a line that passes through vertex 70 and is perpendicular to base 50.

Figure 3:
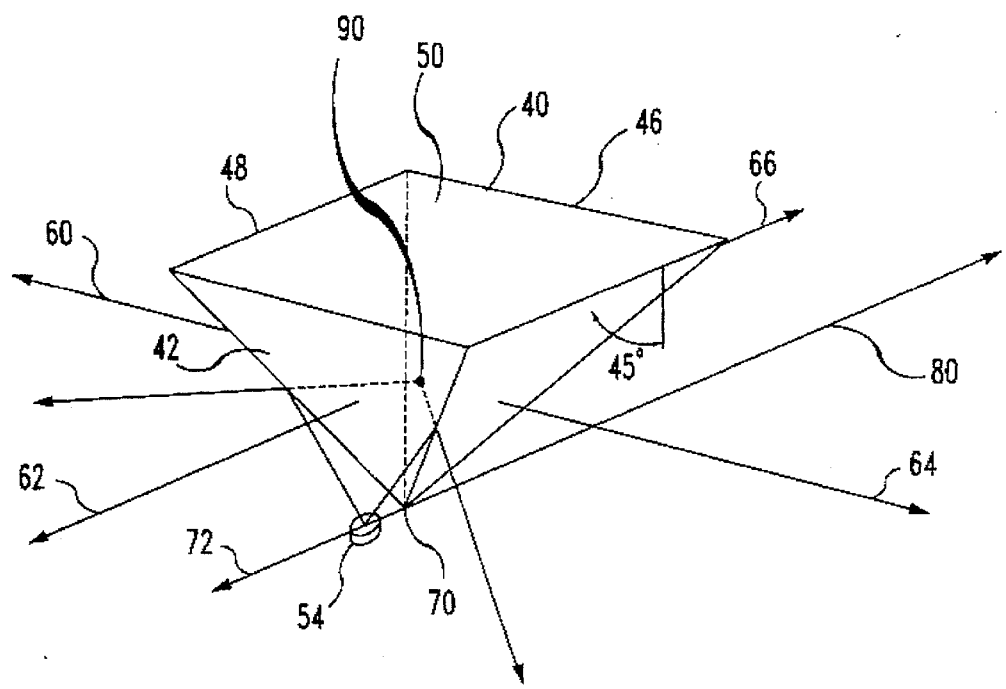
FIG. 3 illustrates how a reflective surface of the pyramid is used to provide each camera with a common optical center.

FIG. 3 illustrates another view of pyramid 40 where only camera 54 is shown for the sake of simplicity. Camera 54 is positioned on line 72 so as to have a virtual optical center at position 90 within pyramid 40. If camera 54 has a 90 degree field of view in the direction perpendicular to base 50, and if the optical center of camera 54 is at a distance of X from vertex 70 along line 72, camera 54 has a 90 degree view in the direction of arrow 62. In similar fashion, cameras 56, 58, and 52 have 90 degree views in the direction of arrows 64, 66, and 60, respectively. This arrangement inexpensively produces a 360 degree field of view of an area because cameras with a 90 degree field of view have relatively inexpensive optics.

Figure 4:
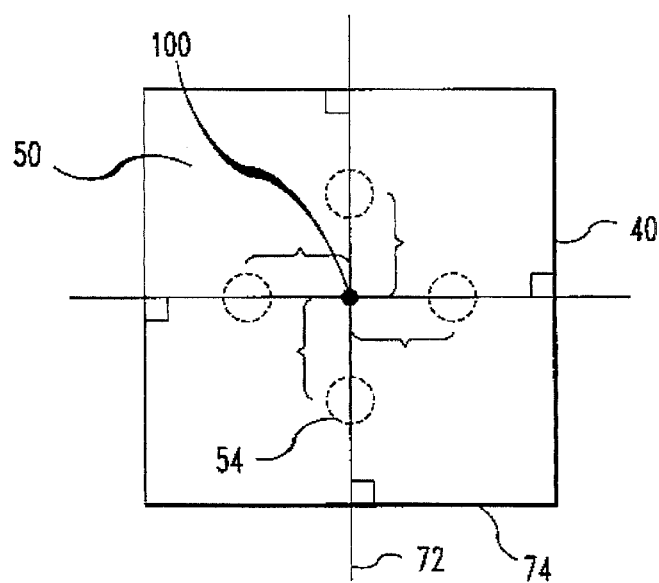
FIG. 4 illustrates the top view of the pyramid illustrating the camera positions.

FIG. 4 is a top view of pyramid 40. FIG. 4 illustrates the placement of the optical center of camera 54 along line 72. Line 72 should be in a plane that passing through vertex 70 and is parallel to base 50. The line should also be perpendicular to base line 74 of pyramid 40. The camera's optical center should be positioned a distance X from vertex 70 along line 72. The distance X should be such that the reflective surface reflects as much of the camera's field of view as desired. Point 100 is located on base 50 at a position where a line from vertex 70 perpendicularly intersects base 50. In a similar fashion, the optical centers of cameras 56, 58 and 52 are positioned the distance X along lines 76, 80 and 84, respectively.

Figure 5:
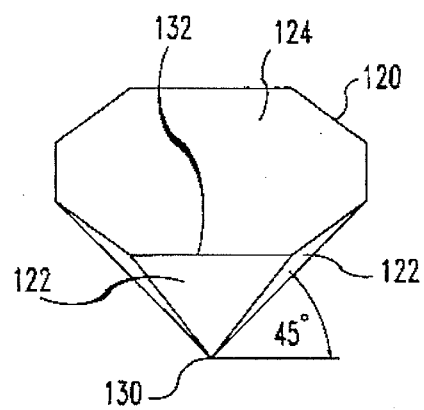
FIG. 5 illustrates an eight-sided pyramid with reflective side surfaces.

FIG. 5 illustrates an eight-sided pyramid 120. Pyramid 120 has reflective surfaces 122 where each of surfaces 122 form a 45 degree angle with a plane that passes through vertex 130 and is parallel to base 124. As with the four-sided pyramid of FIG. 2, each reflective surface of FIG. 5 may have a camera associated with it. Each camera's optical center is positioned on a line that is in a plane that passes through vertex 130 and is parallel to base 124. The line is perpendicular to base line 132 of the reflective surface associated with the camera to be positioned. Using an eight-sided pyramid offers the advantage of using cameras with only a 45 degree field of view to obtain a 360 degree view. Cameras with only a 45 degree field of view have inexpensive optics and enable a 360 degree view to be constructed using relatively inexpensive components.

Figure 6:
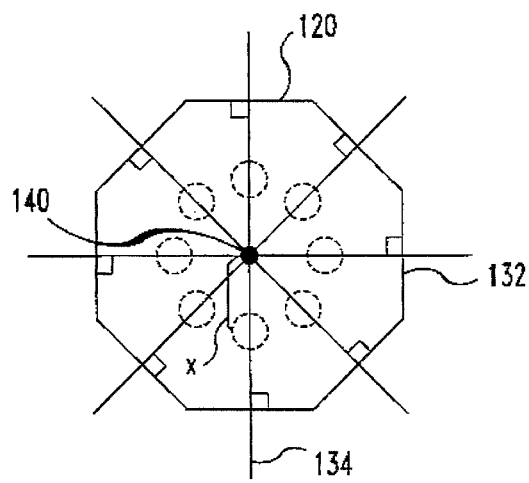
FIG. 6 is a top view of the pyramid of FIG. 5.

FIG. 6 is a top view of pyramid 120. As discussed with regard to FIG. 5, each camera's optical center is positioned along a line 134 which is in a plane that passes through vertex 130 and is parallel to base 124. The optical centers are positioned a distance X along line 134 which is perpendicular to the appropriate base line 132. Point 140 is on base 124 at the point of intersection between base 124 and a line that passes through vertex 130 and is perpendicular to base 124.

Pyramids having more or less reflective sides may be used. The advantage of using pyramids having a large number of sides is that cameras with moderate to small fields of view may be used. Cameras with moderate fields of view have relatively inexpensive optics. The number of sides used in a pyramid is somewhat limited by the cost of providing a large number of cameras. A 360 degree view of a scene may be provided using a pyramid having three reflective sides. It may be expensive to use only a three-sided pyramid in order to provide a 360 degree field of view. This embodiment of the invention uses three cameras each with a 120 degree field of view, and cameras with such a wide field of view use relatively expensive optical components.

In applications where a full 360 degree view is not desired, it is possible to build a viewer that does not have a camera associated with each reflective surface of the pyramid.

Figure 7:
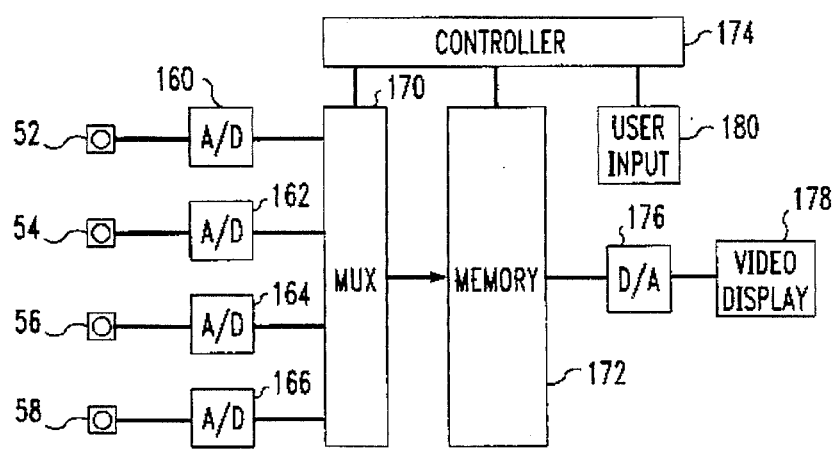
FIG. 7 is a block diagram of a system to control data produced by the cameras.

FIG. 7 illustrates a block diagram of a system for controlling data produced by the cameras of a viewing device such as the viewing device described in FIGS. 2 through 4. Cameras 52, 54, 56 and 58 obtain a 360 degree view of an area via their associated reflective surfaces of pyramid 40 The image signal or output signal of cameras 52, 54, 56 and 58 are passed through analog to digital converters (A/D) 160, 162, 164, and 166, respectively. The output of the cameras can be thought of as a stream of pixels and the output of the A/Ds can be thought of as data representative of the pixels from the cameras. The output of the A/Ds are passed through mux 170. Mux 170 allows the pixel data from each of the A/Ds to reach memory 172. Controller 174 cycles the select lines of mux 170 so that the outputs of all of the A/Ds are stored in memory 172. Mux 170 is switched at a rate that is four times the pixel rate of the cameras. If more or less cameras are used, the rate at which mux 170 is switched will be increased or slowed accordingly. It is also possible to eliminate mux 170 and to store the output of each A/D in a separate memory. Controller 174 is implemented using a microprocessor which provides control signals to counters that control the switching of mux 170 and counters used to provide addressing to memory 172. The control signals to the counters include reset, enable and a starting offset.

As a result of the pixel information being passed to memory 172, memory 172 contains a 360 degree view of a scene. Pixel information stored in memory 172 is passed through digital to analog converter (D/A) 176 and to video display 178. The actual portion of memory 172 that is passed to video display 178 via D/A 176 is controlled via user input device 180. User input device 180 may be a common device such as a mouse, joystick, or keyboard. The user may simply lean a joystick to the fight to shift his view to the right, lean the joystick to the left to shift the view to the left, or leave the joystick in the center to keep the view unchanged. Based on the input from user device 180, controller 174 varies offsets and starting addresses that are used to provide addressing to memory 172.

Figure 8:
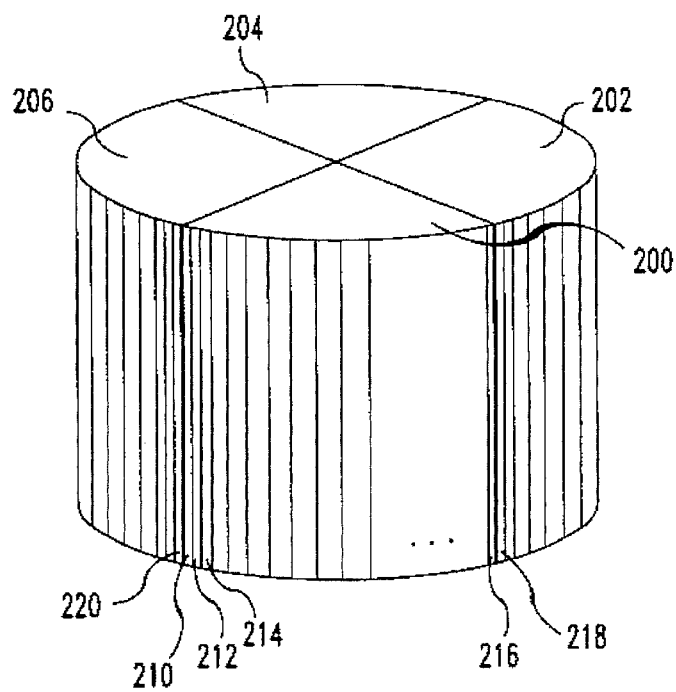
FIG. 8 illustrates the association between the data received from the cameras and the view presented to a user.

FIG. 8 illustrates the relationship between the data representative of each pixel provided by the cameras and the view available to the user. Since the cameras share a virtual optical center, the view can be thought of as a cylindrical view. Sector 200 can be thought of as representing the information provided by camera 52, sector 202 can be thought of as representing the information provided by camera 54, sector 204 can be thought of as representing the information provided by camera 56, and sector 206 can be thought of as representing the information provided by camera 58. The surface of the cylinder in each sector can be thought of as a collection of columns, where each column is composed of pixels. For example, sector 200 can be thought of as a collection of columns including columns 210, 212, 214 and 216. Likewise, the output produced by camera 54 can be thought of as a collection of columns which include column 218 in sector 202 and the output of camera 58 can include columns such as column 220 in sector 206. The column of pixels near the sector boundaries are closer together then the columns near the center of a sector. This occurs because the cameras capture the image on a plane while FIG. 8 shows the columns projected onto a cylindrical surface.

Figure 9:
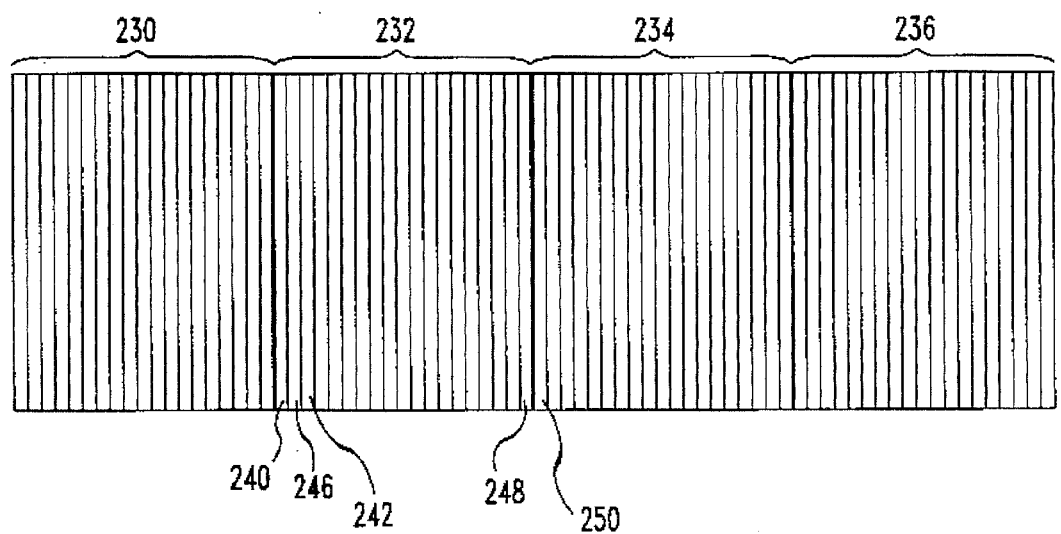
FIG. 9 illustrates an addressing scheme for the memory of FIG. 7.

FIG. 9 illustrates how memory 172 is divided to provide easy access to different views based on signals from user input device 180. Sections 230, 232, 234 and 236 correspond to sectors 206, 200, 202 and 204, respectively. Each of sections 230, 232, 234 and 236 can be thought of as a block within memory 172. The blocks in memory 172 are broken into columns of sequential addresses. The first column of memory segment 230 corresponds to the first column of pixels of sector 206. The number of memory positions associated with a column should be at least sufficient to have one location for each pixel in a particular column. For example, if a column of pixels from FIG. 8 includes 1000 pixels, each column associated with the memory segments of FIG. 9 should have at least 1000 locations. The number of columns associated with a particular memory segment should be at least equal to the number of columns associated with a particular section of the cylinder of FIG. 8. For example, if a camera uses 1000 pixels in a horizontal scan there should be at least 1000 columns in a particular section of the cylinder of FIG. 8. As a result, there should be at least 1000 columns for each memory segment of FIG. 9. If each camera has a 1000 pixel by 1000 pixel scan, each segment of memory illustrated in FIG. 9 should have 1000 columns that are 1000 locations deep.

If a camera scans in a horizontal direction, sequential pixels are written in adjacent columns of a particular memory segment by simply changing an offset to a counter generated address. The overall write address is generated by adding the offset to the counter's output. This offset is changed at the rate in which the horizontally scanned pixels are received. After a horizontal scan is completed, the counter is incremented and once again the offsets are cycled at the horizontal scan rate. As a result, when addressing a particular segment of memory during a write cycle, the columns are addressed by changing the offset at the horizontal pixel scan rate, and incrementing the counter at the vertical scan rate. This type of addressing scheme is used for accessing columns within each memory segment. When addressing different memory segments during a write cycle, a write segment offset is added to the sum of the counter output and the column offset. The write segment offset permits addressing memory segments 230, 232, 234, and 236. The segment offset is changed at the same rate as mux 170 is switched.

Pixel data is read from memory 172 in a similar fashion. The sum of a counter output and two sets of offsets are used to generate a read address. Once an initial starting column has been picked, the read address is generated by switching a read column offset at a rate that is equal to the horizontal scan rate of a video display. After reading one horizontal scans worth of data, the read counter is incremented and the read column offsets are cycled at a rate equal to the horizontal scan rate of the display. As a result, the offset addresses are cycling at the display's horizontal display rate and the counter is incremented at a rate equal to the vertical scan rate of a display. It is possible to read data out at a rate faster or slower than required by the video display; however, if read out faster, a buffer memory should be used, if read out slower the video display may appear choppy to the viewer.

It should be noted that the cylindrical arrangement of pixels of FIG. 8 is typically displayed on a flat or nearly flat display. As a result, the image is displayed by compensating for converting between a cylindrical surface and a flat surface. This may be carried out using a simple conversion algorithm within a common digital signal processing integrated circuit. Methods for these types of conversions are well known in the art and can be found in "A Guided Tour of Computer Vision, Vishvjit S. Nalwa, Addison-Wesley Publishing Co., Reading, Mass., 1993". It is also possible to carry out the conversion using a very high resolution display. For example, if the display has 1000 columns of pixels and the view only contains 100 colunms of pixels, columns near the sector boundaries of FIG. 8 can be assigned 5 display columns while colunms near the sector centers of FIG. 8 can be assigned 15 display colunms.

It should be noted that if the view selected by a user corresponds exactly to the view of a particular camera, such as camera 52, colunms 240–248 are read from memory 170. Column 240 is the first column in segment 232 and column 248 is the last column in segment 232. If the user decides to move the view in a counter-clockwise direction, the start column will shift to the right so that the read operation begins at column 246 and ends at column 250. It should be noted that column 246 is the second column associated with memory segment 232 which has the pixel data from camera 52, and that column 250 is the first column of pixel data associated with camera 56. As the user shifts the view, the starting column shifts in relationship to the user's commands. For example, if the user indicates that the view should shift in a counter-clockwise direction, the start column of FIG. 9 moves to the right, similarly, if the viewer indicates that the view should shift in a clockwise direction, the start column shifts to the left. As before, columns are addressed by using offsets, if the offsets involve moving between memory segments, a read segment offset is added to the sum of the column offset and counter output.

It should be recalled that the columns near the sector boundaries of FIG. 8 are closer together. As a result, when the user commands a change in a view and when the border of that view is near a sector boundary, the start column changes by a larger number of columns for a given angular rotation of the view. Conversely, when the border of the view is near the center of the sector, the start column changes by a smaller number of columns for a given angular rotation.

Figure 10:
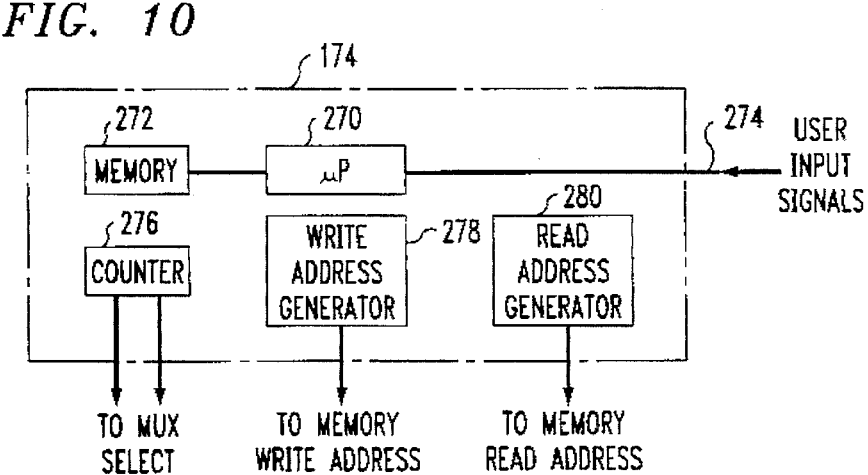
FIG. 10 is a block diagram of the controller of FIG. 7.

FIG. 10 illustrates a block diagram of controller 174. Controller 174 includes microprocessor 270 and memory 272. Memory 272 includes RAM and ROM. Processor 270 receives commands on line 274 from user input device 180. Microprocessor 270 controls start, stop and reset of counter 276. Counter 276 controls the select lines of mux 170. Counter 276 counts at a rate that is four times the horizontal scan rate of the cameras. Write address generator 278 provides write addressing for memory 172. Write address generator 278 includes a counter, register for storing offsets and adder for adding the offsets and counter output. Microprocessor 270 controls the offset selection and the counters used by write address generator 278. The write addresses are formed as described with regard to FIG. 9. Read address generator 280 provides read addresses to memory 172. Read address generator 280 includes a counter, register for storing offsets and adder for adding the offsets and counter output. As with write address generator 278, microprocessor 270 controls the offset selection and the counters of read address generator 280. Microprocessor 270 also controls the starting column used by the counters based on inputs provided on line 274 from user input 180.

The write and read addresses are provided to memory 172 separately if memory 172 is implemented using a two port memory. If memory 172 is implemented with a single port memory, the write and read addresses are multiplexed to memory 172.

Figure 11:
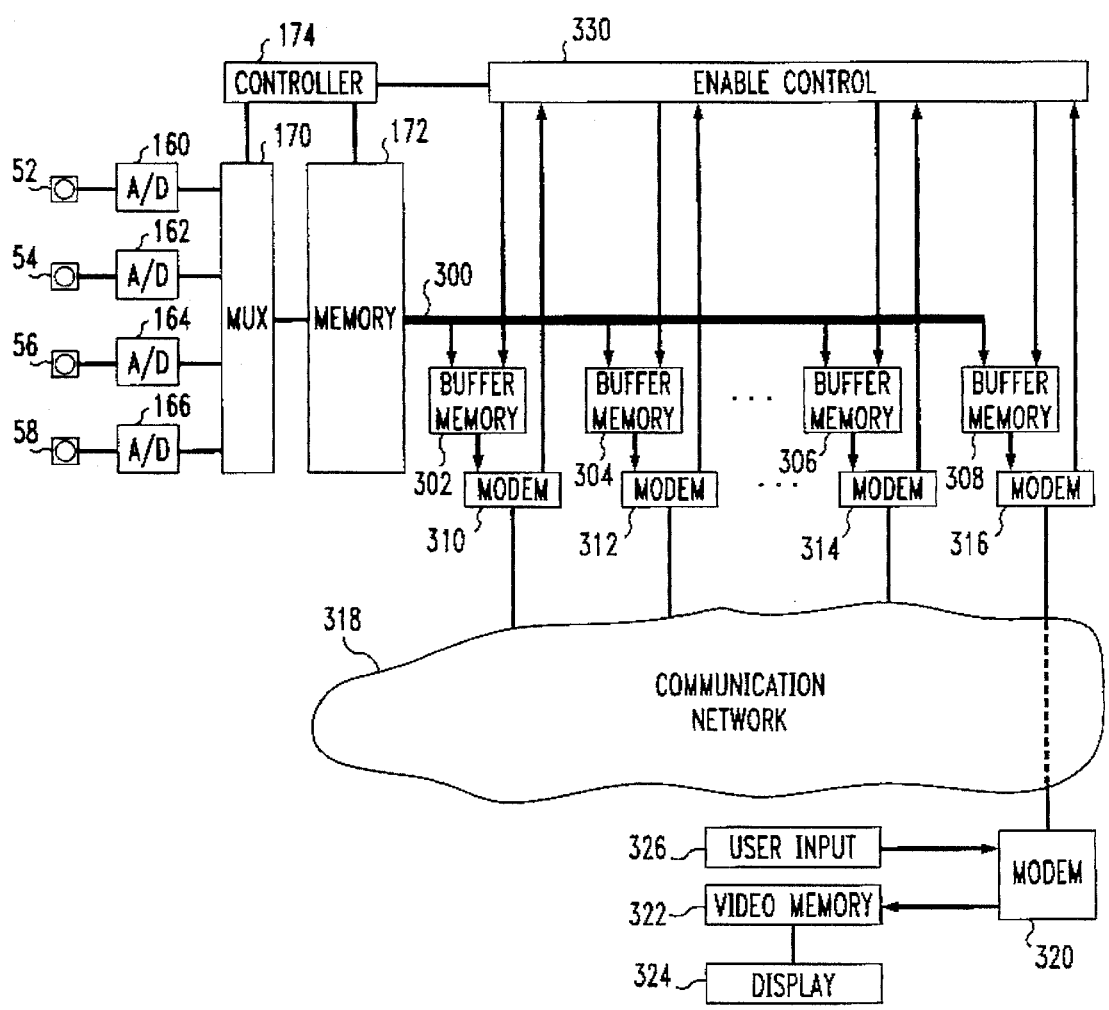
FIG. 11 illustrates using a telecommunications network to provide a selection of views to a plurality of users.

FIG. 11 illustrates an embodiment where a panoramic viewer is used to provide views to several users over a communications network. In this embodiment, all of the columns of pixel data are read from memory 172 and placed on bus 300. Buffer memories 302, 304, 306 and 308 receive the data from bus 300. The buffer memories are enabled only when desired columns are available on bus 300. The buffer memories then pass their information to modems 310, 312, 314 and 316, which then provide the pixel data to telecommunications network 318. Telecommunications network 318 then delivers the information from the modems to the users. In one example, a user receives information from modem 316 using modem 320. Modem 320 then provides the pixel information that was in memory 308 to a local video memory 322. Video memory provides the pixel information to display 324 for viewing. The user at this location controls the view using user input device 326 which may be a device such as a mouse, keyboard or joystick. Modem 326 transmits the user input device signals over telecommunications network 318 to modem 316 which then provides the signals to enable controller 330. Enable controller 330 receives a signal from controller 174 that indicates which column is being read from memory 172. When the appropriate column is available, the enable controller 330 enables each of the buffer memories to receive the columns of data specified by the user input device signals received over the communication network. As discussed with regard to FIG. 9, enable controller 330 simply moves the start column based on signals from the user input device. In this embodiment, enable controller 330 enables the input to the buffer memory when the pixel data from the start column is on bus 300. Enable controller 330 disables the input to the buffer memory when the total number of columns of pixels to be viewed are provided to the buffer memory. FIG. 11 illustrates a system where four users can individually control their viewing; however, more users may be accommodated by simply increasing the number of buffer memories, modems, and ports on enable controller 330.

Figure 12:
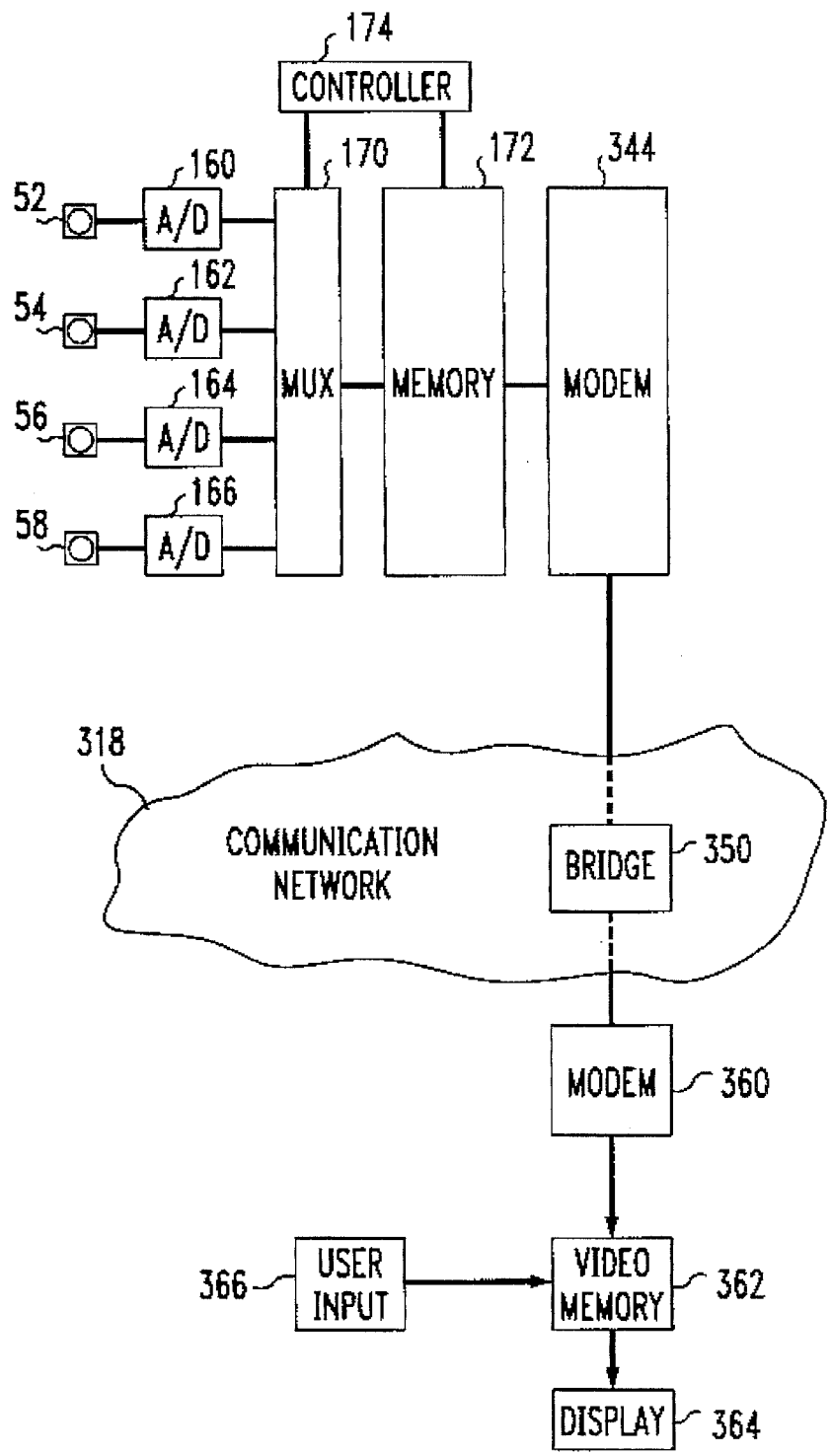
FIG. 12 illustrates a second embodiment for providing a selection of views to multiple users over a telecommunications network.

FIG. 12 illustrates another embodiment in which multiple viewers can use the pannoramic viewer. As the pixel data is read from memory 172, all of the data is passed over telecommunications network 318 to telecommunications bridge 350. The information from memory 172 is provided to bridge 350 via modem 344; however, the data may be passed to bridge 350 without use of modem 344 if a digital connection is made between memory 172 and bridge 350. Bridge 350 then distributes all of the data received from memory 172 to each user in communication with bridge 350. If bridge 350 provides analog link to users, a modem should be used at each user port. If the bridge has a digital link to the user ports, a modem is not required. In the case of an analog link, the data from memory 172 passes from modem 344 via bridge 350 to modem 360 at a user port. Modem 360 passes the pixel data to video memory 362. Video memory 362 then passes the pixel information to video display 364 under control of a user via user input device 366. User input device may be a mouse, joystick or computer keyboard. In this embodiment, the entire contents of memory 172 is fed to video memory 362. The data read from memory 362 and passed to video display 364 is controlled using user input device 366 in a fashion similar to that which was described with regard to FIG. 9.

The invention claimed is:

1. A panoramic projection apparatus, comprising:

a plurality of image producing devices; and a pyramid shaped element having a plurality of reflective side facets facing in different directions so as to reflect images from the plurality of image producing devices in different directions to form a panoramic image, each of the plurality of facets reflecting an image from one of the plurality of image producing devices.

2. The panoramic projection apparatus of claim 1, wherein the pyramid has four reflective sides.

3. The panoramic projection apparatus of claim 2, wherein the pyramid reflects images from four of the image producing devices.

4. The panoramic projection apparatus of claim 1, wherein the pyramid has eight reflective sides.

5. The panoramic projection apparatus of claim 1, wherein each of the reflective side facets form a 45° angle with a base of the pyramid shaped element.

6. The panoramic projection apparatus of claim 5, wherein each of the image producing devices have an optical axis perpendicular to the base.

7. The panoramic projection apparatus of claim 6, wherein an optical center of each of the image producing devices are co-planer with a vertex of the pyramid shaped element.

8. The panoramic projection apparatus of claim 1, wherein the image producing devices are comprise film.

9. The panoramic projection apparatus of claim 1, wherein the image producing devices are LCDs.

10. The panoramic projection apparatus of claim 1, wherein the image producing devices are electronic display panels.

* * * * *

UNITED STATES PATENT AND TRADEMARK OFFICE
CERTIFICATE OF CORRECTION

PATENT NO. : 5,539,483
DATED : July 23, 1996
INVENTOR(S) : Vishvjit S. Nalwa

It is certified that error appears in the above-identified patent and that said Letters Patent is hereby corrected as shown below:

Column 8 line 60: Change "image producing devices are comprise film" to --image producing devices comprising film--.

Signed and Sealed this

Thirty-first Day of March, 1998

Attest:

BRUCE LEHMAN

Attesting Officer

Commissioner of Patents and Trademarks